(12) United States Patent
Srikumar et al.

(10) Patent No.: US 10,691,111 B2
(45) Date of Patent: **\*Jun. 23, 2020**

(54) INTELLIGENT PRODUCTION STATION AND PRODUCTION METHOD

(71) Applicant: Aviat U.S., Inc., Austin, TX (US)

(72) Inventors: Kesavan Srikumar, Cupertino, CA (US); Frank Pong, Los Gatos, CA (US)

(73) Assignee: Aviat U.S., Inc., Austin, TX (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/705,759

(22) Filed: May 6, 2015

(65) Prior Publication Data

US 2015/0234380 A1    Aug. 20, 2015

Related U.S. Application Data

(63) Continuation of application No. 13/271,025, filed on Oct. 11, 2011, now Pat. No. 9,058,567, which is a
(Continued)

(51) Int. Cl.
  *G05B 19/418* (2006.01)
  *G06Q 10/00* (2012.01)

(52) U.S. Cl.
  CPC ......... *G05B 19/4183* (2013.01); *G06Q 10/00* (2013.01); *G05B 2219/31044* (2013.01);
  (Continued)

(58) Field of Classification Search
  CPC ............... G06Q 10/00; G05B 19/4183; G05B 2219/31104; G05B 2219/31095;
  (Continued)

(56) References Cited

U.S. PATENT DOCUMENTS 5,610,807 A    3/1997    Kanda et al.
5,809,287 A    9/1998    Stupek et al.
(Continued)

FOREIGN PATENT DOCUMENTS

EP    1657610    5/2006
WO    2004014274    2/2004
(Continued)

OTHER PUBLICATIONS

European Patent Application No. 07865710.3, Examination Report dated Jul. 19, 2013.
(Continued)

*Primary Examiner* — Charles R Kasenge
(74) *Attorney, Agent, or Firm* — Sheppard, Mullin, Richter & Hampton LLP

(57) ABSTRACT

One aspect related to design of systems and methods for manufacturing products that include technology in skilled areas is configuring a production station for use by an operator without specialized skills. The present invention contemplates an approach to designing a station configurable to perform one or more of incoming inspection, assembly, testing, and branding. A preferred approach includes verifying data associated with units prior to accepting them for incorporation, preventing incorporation of an incorrect unit, and guiding an operator in possible remedial action. This approach includes storing data in a server and making such data substantially instantly accessible to production stations once written in the server. Such data preferably includes software to configure the production station such that the operator need not have specialized skills. A production station designed using this approach is particularly useful in the manufacture of an outdoor unit of a split-mount microwave radio system.

19 Claims, 4 Drawing Sheets

Related U.S. Application Data continuation of application No. 11/615,893, filed on Dec. 22, 2006, now Pat. No. 8,041,444.

(52) U.S. Cl.
CPC .............. *G05B 2219/31061* (2013.01); *G05B 2219/31095* (2013.01); *G05B 2219/31104* (2013.01); *G05B 2219/32197* (2013.01); *G05B 2219/33199* (2013.01); *Y02P 90/04* (2015.11); *Y02P 90/10* (2015.11); *Y02P 90/14* (2015.11); *Y02P 90/18* (2015.11); *Y02P 90/185* (2015.11); *Y02P 90/22* (2015.11); *Y02P 90/265* (2015.11)

(58) Field of Classification Search
CPC ........... G05B 2219/31061; G05B 2219/31044; G05B 2219/33199; G05B 2219/32197; Y02P 90/10; Y02P 90/04; Y02P 90/22; Y02P 90/265; Y02P 90/18; Y02P 90/14; Y02P 90/185

See application file for complete search history.

(56) References Cited

U.S. PATENT DOCUMENTS

| | | | |
|---|---|---|---|
| 5,867,714 A | 2/1999 | Todd et al. | |
| 5,960,189 A | 9/1999 | Stupek et al. | |
| 6,154,738 A | 11/2000 | Call | |
| 6,202,070 B1 | 3/2001 | Nguyen et al. | |
| 6,223,092 B1 | 4/2001 | Miyakawa et al. | |
| 6,282,709 B1 | 8/2001 | Reha et al. | |
| 6,535,915 B1 * | 3/2003 | Valys | G06F 8/61 709/221 |
| 6,563,269 B2 | 5/2003 | Robinett et al. | |
| 6,647,304 B2 | 11/2003 | Tsukishima et al. | |
| 6,735,490 B2 | 5/2004 | Anand et al. | |
| 6,802,659 B2 | 10/2004 | Cremon et al. | |
| 6,804,569 B1 | 10/2004 | Hirano et al. | |
| 6,809,292 B2 | 10/2004 | Spear et al. | |
| 6,922,599 B2 | 7/2005 | Richey | |
| 6,924,459 B2 | 8/2005 | Spear et al. | |
| 6,934,671 B2 | 8/2005 | Bertsch et al. | |
| 6,954,929 B2 | 10/2005 | Erickson et al. | |
| 7,031,901 B2 | 4/2006 | Abu El Ata | |
| 7,065,461 B2 | 6/2006 | Chang et al. | |
| 7,092,902 B2 | 8/2006 | Eldridge et al. | |
| 7,099,803 B1 | 8/2006 | Rappoport et al. | |
| 7,149,677 B2 | 12/2006 | Jayaram et al. | |
| 7,174,276 B2 * | 2/2007 | John Swansen | G06F 17/50 702/179 |
| 7,376,870 B2 | 5/2008 | Kataria et al. | |
| 7,389,504 B2 | 6/2008 | Kawano et al. | |
| 7,461,008 B2 | 12/2008 | Garrow et al. | |
| 7,593,872 B2 | 9/2009 | Eldridge et al. | |
| 7,640,458 B2 * | 12/2009 | Rao | G06F 11/1433 714/38.14 |
| 7,668,612 B1 | 2/2010 | Okkonen | |
| 7,716,276 B1 * | 5/2010 | Ren | G06F 8/65 455/418 |
| 7,747,997 B1 * | 6/2010 | Rao | G06F 8/65 717/169 |
| 7,770,165 B2 * | 8/2010 | Olson | G06F 8/68 709/203 |
| 7,822,499 B2 | 10/2010 | Nakamura | |
| 7,873,959 B2 * | 1/2011 | Zhu | G06F 8/65 706/20 |
| 7,913,242 B2 * | 3/2011 | Holland | G06F 8/65 701/1 |
| 8,041,444 B2 | 10/2011 | Srikumar et al. | |
| 8,225,414 B2 | 7/2012 | Raley et al. | |
| 8,712,567 B2 | 4/2014 | Srikumar et al. | |
| 9,058,567 B2 * | 6/2015 | Srikumar | G05B 19/4183 |
| 2001/0043113 A1 | 11/2001 | Hoshino et al. | |
| 2002/0095491 A1 | 7/2002 | Edmonds et al. | |
| 2003/0020512 A1 | 1/2003 | Mantey et al. | |
| 2003/0023962 A1 * | 1/2003 | Erickson | G06F 8/63 717/171 |
| 2003/0050870 A1 * | 3/2003 | Cargille | G06Q 10/06 705/28 |
| 2003/0055736 A1 | 3/2003 | Eldridge et al. | |
| 2003/0135846 A1 | 7/2003 | Jayaram et al. | |
| 2003/0217193 A1 * | 11/2003 | Thurston | G06F 8/65 719/321 |
| 2003/0217358 A1 * | 11/2003 | Thurston | G06F 8/60 717/174 |
| 2004/0039561 A1 * | 2/2004 | Montano | G06F 9/4411 703/22 |
| 2004/0088695 A1 | 5/2004 | Kawano et al. | |
| 2004/0088696 A1 | 5/2004 | Kawano et al. | |
| 2004/0106404 A1 | 6/2004 | Gould et al. | |
| 2004/0181486 A1 | 9/2004 | Eldridge et al. | |
| 2004/0186690 A1 * | 9/2004 | Swanson | G06F 17/50 702/187 |
| 2004/0214097 A1 | 10/2004 | Suttile et al. | |
| 2005/0004821 A1 | 1/2005 | Garrow et al. | |
| 2005/0066015 A1 * | 3/2005 | Dandekar | G06F 8/61 709/220 |
| 2005/0097541 A1 * | 5/2005 | Holland | G06F 8/65 717/168 |
| 2005/0113949 A1 | 5/2005 | Honda et al. | |
| 2005/0114059 A1 | 5/2005 | Chang et al. | |
| 2005/0172284 A1 * | 8/2005 | Dandekar | G06F 8/61 717/175 |
| 2005/0204353 A1 | 9/2005 | Ji | |
| 2005/0256598 A1 | 11/2005 | Mata et al. | |
| 2005/0278793 A1 | 12/2005 | Raley et al. | |
| 2005/0283342 A1 * | 12/2005 | Swanson | G06F 17/50 702/187 |
| 2005/0283392 A1 | 12/2005 | Garrow et al. | |
| 2006/0052892 A1 | 3/2006 | Matsushima et al. | |
| 2006/0085087 A1 | 4/2006 | Hass et al. | |
| 2006/0142887 A1 | 6/2006 | Huang et al. | |
| 2006/0149407 A1 | 7/2006 | Markham et al. | |
| 2006/0173654 A1 * | 8/2006 | Apps | B65G 43/08 702/183 |
| 2006/0174242 A1 * | 8/2006 | Zhu | G06F 8/65 717/172 |
| 2006/0195208 A1 * | 8/2006 | Sammer | G06F 11/006 700/97 |
| 2006/0200261 A1 | 9/2006 | Monette et al. | |
| 2006/0229951 A1 * | 10/2006 | Abels | G06Q 10/08 705/26.1 |
| 2008/0022087 A1 | 1/2008 | Tsujimoto | |
| 2008/0052698 A1 * | 2/2008 | Olson | G06F 8/68 717/168 |

FOREIGN PATENT DOCUMENTS

| | | |
|---|---|---|
| WO | 2005008349 | 1/2005 |
| WO | 2005017790 | 2/2005 |

OTHER PUBLICATIONS

European Patent Application No. 07865710.3, Search Report dated Apr. 11, 2011.
European Patent Application No. 07865714.5, Examination Report dated Jun. 19, 2013.
European Patent Application No. 07865714.5, Search Report dated Feb. 7, 2011.
International Application No. PCT/US2007/081561, International Search Report and Written Opinion dated Jun. 17, 2008.
International Application No. PCT/US2007/087650, International Search Report and Written Opinion dated May 8, 2008.
International Application No. PCT/US2007/087654, International Search Report and Written Opinion dated Jul. 25, 2008.
Singapore Patent Application No. 200904290-4, Written Opinion dated Apr. 6, 2011.

* cited by examiner

INTELLIGENT PRODUCTION STATION AND PRODUCTION METHOD

CROSS-REFERENCE

This application is a continuation of U.S. nonprovisional application Ser. No. 13/271,025, filed Oct. 11, 2011, and titled "Intelligent Production Station and Production Method," which claims priority to U.S. nonprovisional application Ser. No. 11/615,893, filed Dec. 22, 2006, and titled "Intelligent Production Station and Production Method," which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This invention is generally related to manufacturing and, more specifically, to production of manufactured products, such as microwave radios.

BACKGROUND

Manufacturing of products includes processing of subassemblies at multiple production stations with each station designated, for instance, to one or more of incoming inspection, assembly, testing, calibration, and branding. Many products to be manufactured include multiple subassemblies, one or more of which are capable of being configured in multiple ways. Prior to accepting a subassembly for incorporation into the product, the process ideally verifies data associated with the subassembly, such as part number and configuration revision, to avoid errors.

Such verification requires access to data associated with the bill of materials (BOM) of the product to be manufactured, data from manufacturing stages prior to the subassembly's arrival at the particular production station, correct and actual configuration revisions, etc. If the verification is not successful, the subassembly is not accepted for incorporation into the product.

Some products include technology in particularly skilled areas. Examples of skilled areas of technology include radio frequency and microwave technologies in products such as microwave radios, medical devices such as X-ray, CAT (computed axial tomography) or MRI (magnetic resonance imaging) machines, or fiber optics systems. Such products often include one or more subassemblies capable of configuration. Errors in the manufacture of a product may result, after shipping, in unacceptable performance, liability for failing to conform to regulations or standards, or other anticipated or unanticipated problems. In some skilled areas of technology, such as those involved in medical devices, errors may cause physical harm.

Therefore, there is a need to consider the foregoing in the design of manufacturing systems and methods and the benefit of verifying data associated with subassemblies prior to accepting them for incorporation into a product to be manufactured. One desired aspect of such design might be to substantially increase accessibility of data and software used for verification purposes.

SUMMARY

The present invention addresses these and related aspects of manufacturing system and method design. In particular, the present invention contemplates design of systems for manufacture of units (e.g., components, subassemblies) incorporating skilled areas of technology. A preferred approach includes storing data associated with the product being manufactured, including the units thereof, in a server and making data in the server substantially instantly accessible at the production station. This also includes retrieving data from a unit received at the production station, comparing such data with server data associated with the product, and verifying that the unit is a correct unit for that product. This helps prevent incorporation into the product of an incorrect unit, such as an incorrect part number or an undesirable configuration. Preferably, this approach also includes guiding an operator of a production station to take remedial action, such as to replace the incorrect unit with a correct unit. The preferred approach further allows for remotely controlling the configuration of the production station. A system design using this approach is particularly useful in manufacture of an outdoor unit of a split-mount microwave radio system.

This system design provides a number of possible advantages. Among them is the ability to configure, from a remote location, the tasks the production station is to perform and how it performs them. The configuration includes remotely developing software for use on the production station and making such software available for download, or causing such software to be downloaded, to the production station. Storing data retrieved, generated and updated from the production stations in the server increases the accessibility of data and software needed for manufacture and substantially reduces the likelihood of errors. The system design allows for traceability of data associated with units incorporated into a manufactured product. The system design thus achieved is portable to and capable of being duplicated at any CM (contract manufacturer) with low requirements for maintenance and training of new operators.

Accordingly, for the purpose of the invention as shown and broadly described herein, the present invention is directed to a system and method for manufacture of products. In accordance with one embodiment, a production station for processing manufactured products with one or more units that incorporate technology in a skilled area comprises: a data retrieval component communicatively coupled to a unit of a manufactured product and operative to retrieve data from this unit, the manufactured product comprising at least one unit, including this unit, that incorporate technology in a skilled area, a data access component operative to obtain from a server data associated with the manufactured product, the associated data being substantially instantly accessible to the data access component once written in the server, and a data verification component operative to compare the retrieved data with the obtained data, and to generate an output based on the comparison, wherein the output indicates whether this unit should be accepted for processing or not.

Such production station may be configured to perform one or more of incoming inspection, assembly, testing, branding, and post functional testing of the manufactured product. It may also be configured for being operated by a person who is unskilled in the area of technology. The configuration may be achieved by obtaining from the server and installing on the production station software, instructions, and specifications that have been developed and written in the server. Installation may be initiated at the production station or remotely. The production station may further include a data generation component to generate new or updated data, and a data writing component to write the obtained data and the generated data to the unit, and to write the retrieved data and the generated data in the server. The station may also include an interface component to communicate with (e.g., transfer data to and from) a peripheral device such as a printer or a data logger.

A variation of the production station may include means for retrieving data from a unit of a manufactured product comprising at least one unit, including this unit, that incorporates technology in a skilled area, means for obtaining from a server data associated with the manufactured product, such data being substantially instantly accessible to such means once written in the server, and means for comparing the retrieved data with the obtained data, and for generating an output based on the comparison, wherein the output indicates whether this unit should be accepted for processing or not.

In accordance with another embodiment, a method for processing manufactured products with one or more units that incorporate technology in a skilled area comprises: obtaining from a server data associated with a manufactured product that is being manufactured and comprising at least one unit that incorporates technology in a skilled area including this unit, the data associated with the manufactured product being substantially instantly accessible once written in the server, retrieving data from the unit, comparing the data retrieved from the unit with the data obtained from the server, and generating an output based on the comparison, wherein the output indicates whether this unit should be accepted for processing or not.

Such method may further include processing the unit, generating data, and writing the generated data in the server, to the unit, or both. The processing may include performing one or more of incoming inspection, assembly, testing, branding, and post functional testing.

In accordance with yet another embodiment, a method for processing manufactured products with one or more units that incorporate technology in a skilled area comprises: configuring a production station to perform a production function on a manufactured product, wherein the production station can be operated by a person who is unskilled in an area of technology incorporated in the manufactured product and wherein configuring includes obtaining from a server software, instructions, and specifications associated with the production function, the software, instructions, and specifications having been developed and written in the server, and installing and executing the software, instructions, and specifications on the production station.

In these embodiments, various possible attributes may be present. The data retrieval component may include a scanner, a bar code reader, a keyboard, a key pad, a pointing device such as a mouse, a voice recognition device, or a combination thereof. The unit may comprise an intermediate frequency, radio frequency local oscillator, transceiver, power module, diplexer, or mechanical subassembly. The obtained data may include read-only data, read-and-write data, or both. Furthermore, portions of either type of such data may be designated restricted access.

One application for these manufacturing systems is in the manufacture of a wireless radio system, particularly one that operates in the microwave frequency range. Thus, the systems and methods may be adapted for manufacture of an outdoor unit of a split-mount wireless radio system.

These and other features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION

Figure 1:
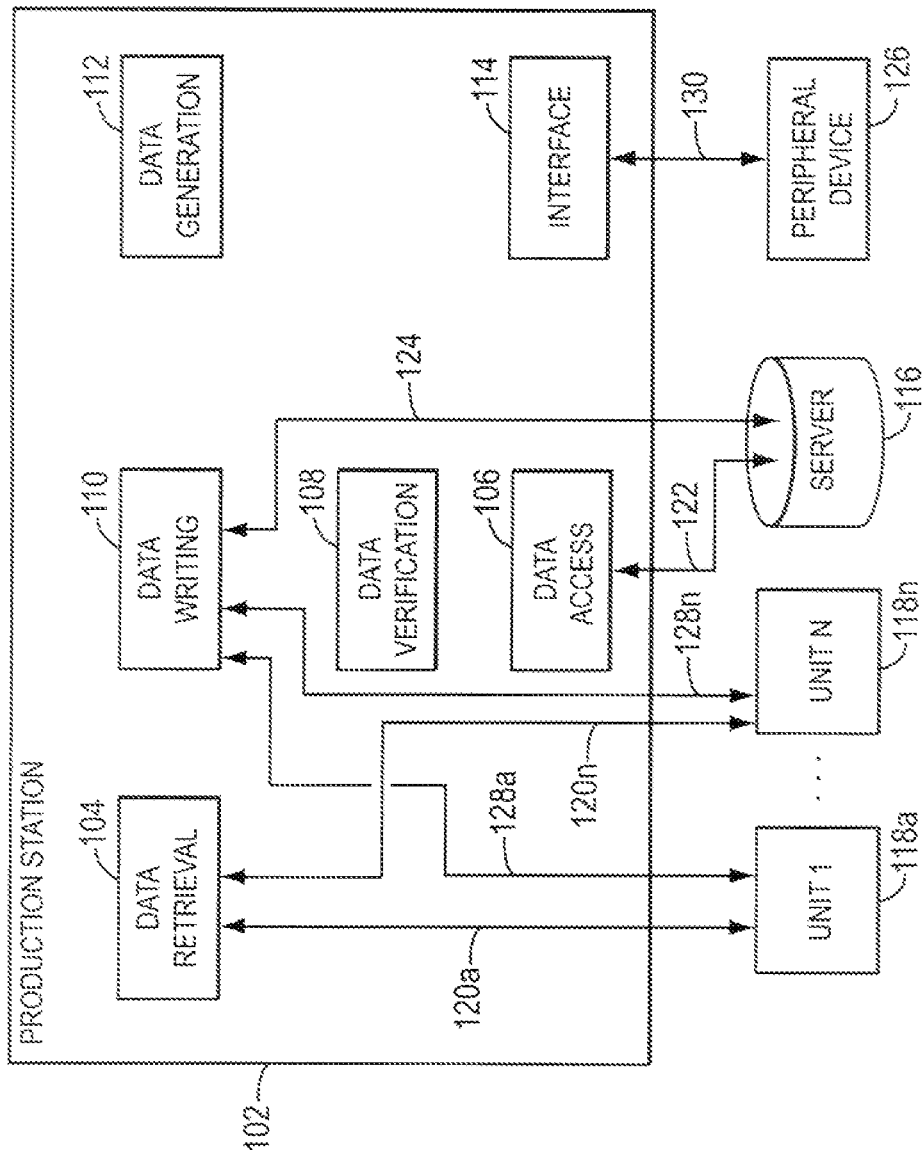
FIG. 1 illustrates a production station according to one embodiment of the invention.

As mentioned, the present invention contemplates a design approach for manufacturing products comprising multiple units. The design may be implemented as a production station. A production station is part of a manufacturing process and may be positioned at one of many stages in the process flow. Its main functions may generally be divided into two categories, namely control over the product being manufactured, and control over the configuration of the station itself.

Functions related to control over the product include verifying data associated with units prior to accepting them for incorporation into the product. Upon receipt of a unit, the production station obtains information from a server. The information may be associated with the unit as well as with the product. Examples include a BOM (bill of materials) for the product to be manufactured, and the part number and configuration of correct units according to the BOM. If the unit is a correct unit for the product, the production station also verifies that processing at prior stages in the process flow is complete. If the verification is successful, the unit is accepted. If not, the production station typically displays an error message to the operator and helps prevent incorporation of the unit into the product.

The production station may also guide the operator to take remedial action. For example, if the unit fails verification because the software revision is incorrect, the operator may be guided to have the unit reconfigured, for example, by having a different software revision installed on the unit. Reconfiguration may be performed on a separate production station or on the same production station configured to perform more than one set of functions, including reconfiguration. If the unit fails verification because the hardware configuration is incorrect, the operator may be guided to replace the unit with a properly configured unit.

During processing of the unit, the production station collects data. The station may write collected data in the server, to memory in the one or more units incorporated in, or to be incorporated into, the product, or in both the server and to the unit. Collected data may include, for example, a calibration file to be used at a stage following a production station configured as an assembly station.

The second category of functions includes control over the configuration of the production station itself. As noted, the production station may include multiple functions, for instance, incoming inspection and testing, or assembly and calibration. Even if the station performs substantially only one function, its configuration may depend on the functions to be performed. For example, a station may be configured to assemble microwave radio systems one week and to test medical devices the following week. The company may also wish to alter the functions of the production station, for example, by adding, deleting or modifying a process step. To that end, the production station may download and install from the server revised software, instructions, and specifications to be used on the station itself. Alternatively, download and installation may be initiated from a remote company location.

A company may be an entity for which the products are being manufactured, and it may be the entity that drives demand for products to be manufactured by a CM (contract manufacturer) and that pays the CM for such manufactured products. A company may be the entity owning the product design. Such company may also be the entity for which a particular product is being manufactured under OEM (original equipment manufacturer) branding. A company may perform its own manufacturing, for example, at its own manufacturing plant. In such a case, there is no third party CM, and the company and the CM may essentially be one and the same entity. In other situations, the company and the CM may be different entities but belong to the same parent entity. For example, the company may be a U.S.-based subsidiary and the CM a China-based subsidiary of the same parent entity. In such a situation, whether the company and the CM are treated as two different entities or as a single entity may depend on how demand is driven, payments are made, and confidential and proprietary information is shared between the two subsidiaries. A company and a CM are typically, but not necessarily, separate from suppliers of components and subassemblies to be incorporated into manufactured products and from suppliers of the equipment used in the manufacturing process. This may also apply to customers, i.e., entities purchasing the manufactured product from the company.

The preferred approach to designing a system for manufacturing products therefore includes controlling the manufacturing process and preventing incorporation of an incorrect unit. This approach also includes guiding the operator to take remedial action, if possible. The approach will preferably achieve the goal of substantially increasing accessibility of data by storing data in a server and making the design portable to multiple manufacturing plants. A design using this approach is particularly useful in the manufacture of an outdoor unit of a split-mount microwave radio system.

This design approach has taken into consideration the beneficial aspects as well as deficiencies of various manufacturing system designs. One such design may include manually collecting, on paper, data associated with the unit. For example, data collected manually may be logged on a traveler card that follows the unit on the manufacturing line, with the card being stamped at each production station and capable of being annotated by the operator. The card is typically archived and may be retrieved to review the data at a later time. Other data may be collected electronically, for example, on a local computer (e.g., coupled to a stand-alone production station) or in one or more databases on a computer system.

Alternatively, such design may include developing, at company development headquarters, new revisions of software, instructions, and specifications to be used on the production station. Once released, such new revisions may be transferred, for example, to a remote manufacturing plant (e.g., a CM's plant) via mail (e.g., on CD-ROM), e-mail, FTP (file transfer protocol), or the like.

As a further alternative, such design may include manual verification that the proper part number, configuration, branding, and so forth are used during the manufacture. A human error in the verification may not necessarily lead to the manufactured product's failing subsequent tests, depending on which incorrect unit or incorrect configuration was actually used. A product thus manufactured, even if it passes manufacturing tests, may nonetheless fail in the field.

Moreover, in some design approaches, a customer's order may be filled by first manufacturing all products in a single (e.g., predefined) configuration. All or a subset of such manufactured products may then be reconfigured to conform to, for example, a downgrade in the software revision with such products being later used as spares or replacements for the customer's existing installation of products. Another subset may be reconfigured to private labeling. The foregoing approaches each addresses one or more aspects of manufacture, pre-incorporation verification, and data collection albeit not necessarily simultaneously in the same production station or based on a design that lends itself to manufacturing products incorporating technology in a skilled area without the need of specialized technical capabilities at the manufacturing plant.

Thus, a preferred approach generally includes electronic collection and storage, in a server, of substantially all information, including manufacturing data, software, instructions, and specifications used, generated, and updated and making such information accessible to multiple production stations in the manufacturing plant as well as, preferably, to the company headquarters. The preferred approach further includes a production station adapted to guide the relatively low-skilled operator in the manufacture of the product even when the product incorporates technology in a high-skilled area.

To illustrate various aspects of the present invention, FIG. 1 is a block diagram of a production station 102 according to one embodiment of the invention. The production station 102 is included in a manufacturing system typically owned and operated by a company. The manufacturing system as described herein refers to the system at the company and its manufacturing plant or the manufacturing plant of a CM. The manufacturing system does not extend to a system used by a supplier of units, nor does it extend to a system used by a customer of the company.

The production station 102 comprises a data retrieval component 104, a data access component 106, a data verification component 108, a data writing component 110, a data generation component 112, and, optionally, an interface component 114. In some implementations, the production station 102 may include a PC (personal computer) or other computerized system. One or more components of the station 102 may be automated, i.e., require input or supervision by a human being (e.g., an operator). Alternatively, one or more components of the station 102 may be automatic, i.e., require no input or supervision by the operator. As a further alternative, one or more components of the station 102 may be performed manually, for example, retrieving and storing data on the traveler card.

The data retrieval component 104 is operative to retrieve data from one or more units 118a through 118n. Each unit 118 may include a component (e.g., an integrated circuit), a subassembly, or a partially assembled product, depending, for example, on the position of the production station 102 in the manufacturing flow. In some embodiments, the data retrieval component 104 may include any input device adapted to retrieve data by manual input (e.g., typing) or automated input (e.g., selection from a menu by the operator or by recognition of the operator's voice), or a combination thereof. Examples of input devices may include a scanner or a bar code reader, a user input device, such as a keyboard, a key pad, a pointing device such as a mouse or the like.

The retrieval is accomplished by operatively connecting the units 118a through 118n to the retrieval component 104 via communications links 120a through 120n. In some embodiments, one or more of the communications links 120 comprises an optical link, for example, the link established using a scanner or bar code reader. In some embodiments, one or more of the communications links 120 comprise a data cable, for example, a serial RS-232 cable, a cable including a parallel port, a USB (universal serial bus) or fire wire cable, a wireless connection such as Bluetooth, or the like. In some embodiments, the communications link is omitted (e.g., not necessary). For example, when the operator retrieves the data by looking at the unit after which the operator enters the data by typing it in or by giving a voice command to the data retrieval component 104, there is essentially no communications link between the unit, per se, and the data retrieval component 104.

The data access component 106 is operative to obtain data associated with each unit 118 and with the product to be assembled from a server 116. Access is obtained via a communications link 122. The data associated with the product may include top level product data, such as a top level part number and a top level serial number, the BOM, and a desired configuration revision, i.e., the correct configuration revision to be used in this product. The desired configuration revision may be a predefined or a required configuration revision. The desired configuration revision may include a desired software revision or software licensing option, which is associated, for example, with a throughput capacity of a radio being assembled. The desired configuration revision may further include a calibration file or branding data, for example, identifying whether the product is to include OEM branding, standard company branding, or no branding. The data associated with the unit 118 may include a supplier part number, a company part number, a CM (contract manufacturer) part number, a serial number, an actual configuration revision, a desired configuration revision, a calibration file, branding data, and the like.

The communications link 122 may include a LAN (local area network), a WAN (wide area network), an optical fiber, a microwave link, Ethernet, the Internet, Wi-Fi, a private line, a leased line, or the like. In some embodiments, the communications link 122 may include a firewall, a VPN (virtual private network), and it may be further adapted to restrict access to select users (e.g., on an individual basis or on a basis of job function).

As illustrated in FIG. 1, the production station 102 interfaces with the server 116. However, the server 116 is not included as part of the production station 102 itself. A server typically functions as a data repository and data service system. Such system therefore may include a server, a database, a data storage, a data retrieval device, or a combination thereof. The server 116 may comprise one or more servers. For example, the server 116 may comprise a PLM (product lifecycle management) server. The PLM server may in turn include an ERP (enterprise resource planning) server, a CRM (customer relationship management) server, an SCM (supply chain management) server, and the like. Examples of such servers include server hardware and software promoted by companies such as Agile Software Corporation, Oracle Corporation, SAP AG, SAP America, Inc., Autodesk, Inc., and others.

The server 116 may further include an LIA (licensing information application) server. The LIA server or any other portion of the server 116 may be developed by the company or by one or more of the CMs. The LIA server may be used to track licensing of software, including revisions and configurations per customer of, for example, radio software for microwave radios. Data associated with the tracking of licensing includes license terms and options, which may depend on, for example, a number of units manufactured or a radio capacity licensed by the customer. The customer may upgrade its licensed radio capacity, for example, from 4E1 to 8E1, in one or more configurations of manufactured radios that the customer purchases.

The server 116 may also be adapted to store a variety of data associated with individual stages of the manufacturing process, including BOMs, configurations (e.g., software revision number or other revision indication), test results, calibration files, data associated with production control, scheduling, workflow management, quality control, inventory, supply chain planning, and financials, such as a general ledger, accounts payable, etc. The server 116 may be further adapted to store software, instructions, and specifications to be downloaded, installed, and executed on one or more components of the production station 102.

The data verification component 108 is operative to compare data retrieved from the unit 118 with corresponding data obtained from the server 116. The comparison may include verification of the actual configuration revision by comparison with the desired configuration revision. Verification of the configuration revision (actual, desired, or both) may include comparing multiple configuration revision elements. For example, the verification may include checking whether the software revision of the product (i.e., once processing at this production station is completed) matches the data obtained from the server. This may include, for instance, checking whether calibration files associated with the one or more units 118 are compatible among each other and match a desired configuration associated with the top level product data. The verification may further include checking whether the configuration of the one or more units 118 is consistent with the licensing information associated with the purchase order and shipping information obtained from the server. An example of such checking includes whether the country of destination permits operation in the frequency band for which the manufactured microwave radio is, or is to be, configured.

The data verification component 108 is further operative to generate an output based on the comparison. The response may include a success output and a fail output. If the compared data fails to match or is otherwise incompatible, the data verification component 108 may stop further processing of the unit and generate the fail output. The fail output may include an error message displayed to the operator. Examples include an error message in text on a display, a visual error message such as a change of color of a light from, for example, green to red, or from a light turned off to a blinking light. If the compared data matches or is otherwise compatible, the data verification component 108 optionally generates and outputs the success output, and the processing is permitted to proceed.

The data verification component 108 is also adapted to prevent a manual override and to guide the operator to take remedial action, if possible. The guidance may be via voice or visual prompt. For example, if the software configuration revision is found to be undesirable (e.g., incorrect, incompatible, incomplete), the operator may be guided to have the unit reconfigured. Reconfiguration may be performed on a separate production station or on a production station configured to perform more than one set of functions, including reconfiguration. In the latter embodiment, the data access component 106 may download software compatible with the desired configuration from the server 116 for installation on the unit, as further described below. A unit 118 may also, or alternatively, have an undesirable configuration not capable of remedying via software reconfiguration. Examples include a mechanical subassembly or other hardware unit, such as a top cover that includes OEM branding in the form of an embossed logo. The operator may then be guided to take remedial action by replacing that unit with a differently configured unit, such as a unit having standard or no branding.

The data writing component 110 is operative to write data in the server 116 via communications link 124. Writing in the server may include storing and copying. Such data may include data generated during the processing at the production station, such as an updated calibration file or an updated configuration revision. The data writing component 110 is further operative to write data to each unit 118. Writing to the unit may include copying and installing. Such data may include software downloaded by the data access component 106, the updated configuration revision itself, a new or updated calibration file, or branding data. The data may be written to EEPROM (electrically erasable programmable read only memory) in the unit 118. For such purposes, the data writing component 110 is operatively connected to the units 118*a* through 118*n* via communications links 128*a* through 128*n*.

The data generation component 112 is operative to generate data associated with the units 118 or the product being manufactured. Data generated may include newly generated data, such as a new calibration file or new branding data. Data generated may further include updated data, such as additions, deletions, and modifications to existing data (e.g., an updated calibration file). Data generated by the data generation component 112 may be written in the server 116, to the unit 118, or both by the data writing component 110.

The interface component 114 may be optional. It is communicatively coupled with a one or more peripheral devices 126 via communications link 130 and operative to transfer data to and from such peripheral devices 126. Peripheral devices 126 may include input devices, output devices, fixtures, and instruments. Examples of input devices include a keyboard, a key pad, a pointing device such as a mouse, a voice recognition device, or a combination thereof. Examples of output devices include a display and a light source. Such devices allow the operator to, for example, select the remedial action to be taken in response to error message displayed on the output device. A peripheral device 126 may further include a printer, which allows the operator to, for example, print data retrieved from the unit, accessed from the server, or both.

The interface component 114 may further be coupled to a peripheral device 126 comprising a fixture, for example, in a production station configured to perform testing functions on a unit 118. An example includes an intermediate frequency card fixture in which the unit 118 may be disposed. The peripheral device 126 may further include an instrument such as a spectrum analyzer, a power meter, a data logger, or the like. Some embodiments may include peripheral devices operatively connected to other or multiple components of the production station 102. For example, a data logger may be operatively connected to the data retrieval component 104 as well as to the writing component 110 and to the data generation component 112. In such embodiments, part or all of the interface component 114 is included in such other component. Peripheral devices are not shown in FIG. 1.

Communications link 124 is substantially similar to communications link 122, and communications links 128 and 130 are substantially similar to link 120, described above.

The aforementioned server 116 is typically part of an infrastructure of the manufacturing system. Such infrastructure may be installed at the headquarters or at the manufacturing plant of the company or one or more of the CMs. In some embodiments, the server 116 comprises multiple servers, which may be installed at more than one location or operated by more than one entity (e.g., by the company as well as one or more CMs).

As described earlier, the production station 102 may be configured to perform one or more functions of incoming inspection, assembly, testing, branding, and post functional testing. A production station 102 configured as an incoming inspection station may be configured (via software, instructions, and specifications installed and executing on such station) to inspect an incoming shipment. The shipment may include units of one or more types (e.g., part numbers or configurations) from a supplier. The inspection may include retrieving data from documentation associated with the shipment, such as data on a hardcopy of a packing slip. The inspection may also, or alternatively, include uploading (e.g., writing) data in the server. For example, units that include technology in a skilled area may be received together with data in electronic format associated with such units. Such electronic format may be on a CD-ROM. The inspection may further include data verification. For example, a select number of units may be checked by retrieving data associated with such units from the units themselves (e.g., by retrieving data in EEPROM or from a label attached to such unit) and comparing the retrieved data with the data uploaded in the server. Some or all such data verification may be performed automatically, in an automated fashion, or manually.

A production station 102 configured as an assembly station may be configured to obtain data associated with the product to be assembled (e.g., the BOM) from the server, to verify that each unit is a correct unit by comparing data retrieved from the unit with data associated with the obtained from the server prior to accepting such unit for incorporation into the product, generating assembly data, and writing such generated data to a unit incorporated in the product and/or in the server. A method for assembling a product on a production station configured as an assembly station is described in further detail in connection with FIG. 4.

A production station 102 may further be configured as a testing station. Such testing station may be positioned in the process flow prior to or after a production station configured as an assembly station. For example, testing may be performed on a unit following incoming inspection but prior to incorporation of the unit into the product during assembly. Testing may alternatively or additionally be performed on the unit following assembly. Testing may further be performed on a fully assembled product, for example, as part of post functional testing. A production station 102 configured to perform post functional testing may be positioned as the last station in the manufacturing flow prior to the manufactured product being forwarded to finished goods inventory (FGI) or to a shipping area.

A test station 102 may retrieve data from a unit (or multiple units if testing is performed on, for example, the assembled product), obtain data associated with the unit, units, and/or product from the server, and compare the data for verification purposes. Testing may further include interfacing with one or more peripheral devices, such as placing the unit or product in a test fixture and measuring actual values of one or more parameters (e.g., frequency) using an instrument such as a spectrum analyzer. Testing may further include recording such data to a data logger. Data generated during such testing may include new as well as updated data. In some embodiments, a test station 102 may be configured to prompt the operator to perform a visual inspection, for example, of branding external to the unit or the assembled product and to input the result to the test station via an input device such as a keyboard. The test station 102 may also be configured to write generated test data in the server 116, to one or more units 118 (e.g., to EEPROM), or both. The test station 102 may further be configured to display a success or fail output to the operator and, if necessary, to guide the operator in possible remedial action to be taken.

The scope of testing may depend on the product being manufactured and the extent of functions performed on the production station 102, including whether the production station 102 is, for example, a combined assembly and testing station. Testing may include functional testing (e.g., intermediate frequency functional testing or radio frequency local oscillator testing), thermal testing, calibration, post functional testing, boundary scan testing, or in-circuit testing. Testing may further be performed as part of remote troubleshooting by the company's development engineers from a central production station 102. Moreover, testing may include testing the configuration of the production station 102 itself, for example, by downloading and installing a different revision of software, specifications, and instructions for use on the production station.

A production station 102 configured as a branding station may verify the existing branding of a unit or assembled product and add new or different branding. As such, the branding station may retrieve actual branding data from the unit or product, obtain desired branding data from the server, and compare the retrieved and the obtained data. If the data fail to match or otherwise be compatible, the branding station may add branding if none exists. For example, the branding station may add a logo by attaching a unit comprising the logo to, for example, a cover of the product. If the branding is incorrect, the branding station may guide the operator to remove existing branding or to add correct branding on top of the incorrect branding, if possible. If not possible, the branding station may guide the operator to replace the unit comprising the incorrect branding with a correctly branded unit. Depending on the product being manufactured, such replacement may not be possible at the branding station itself, and the operator may be guided to forward a product incorporating incorrect branding to a differently configured production station for removal and replacement of the unit with the incorrect branding. The branding station may further be configured to generate branding data, such as new or updated data, during processing and to write the generated data to the unit or product, in the server, or both.

The manufacturing system may include multiple production stations 102. Examples include at least one production station 102 configured as each of an incoming station, an assembly station, and a testing station at the manufacturing plant, and at least one central production station 102 at the company headquarters. In some embodiments, such central production station 102 may be a combined station, for example, a combined central assembly and development station adapted to also develop new revisions of software, instructions, and specifications for use on the production station 102 (e.g., the production station 102 configured as an assembly station) at the manufacturing plant.

The software, instructions, and specifications allow for a production station 102 to be configured to perform functions in addition to those described herein. For example, a production station 102 may be configured to also attach a label to a unit, such as a label including a software revision number or a customer specific part number. A production station 102 may also be configured to perform functions other than those described herein. For example, a production station 102 may be configured to perform ship-out functions such as guiding the operator in customer and/or destination specific packaging and handling of product to be shipped.

Figure 2:
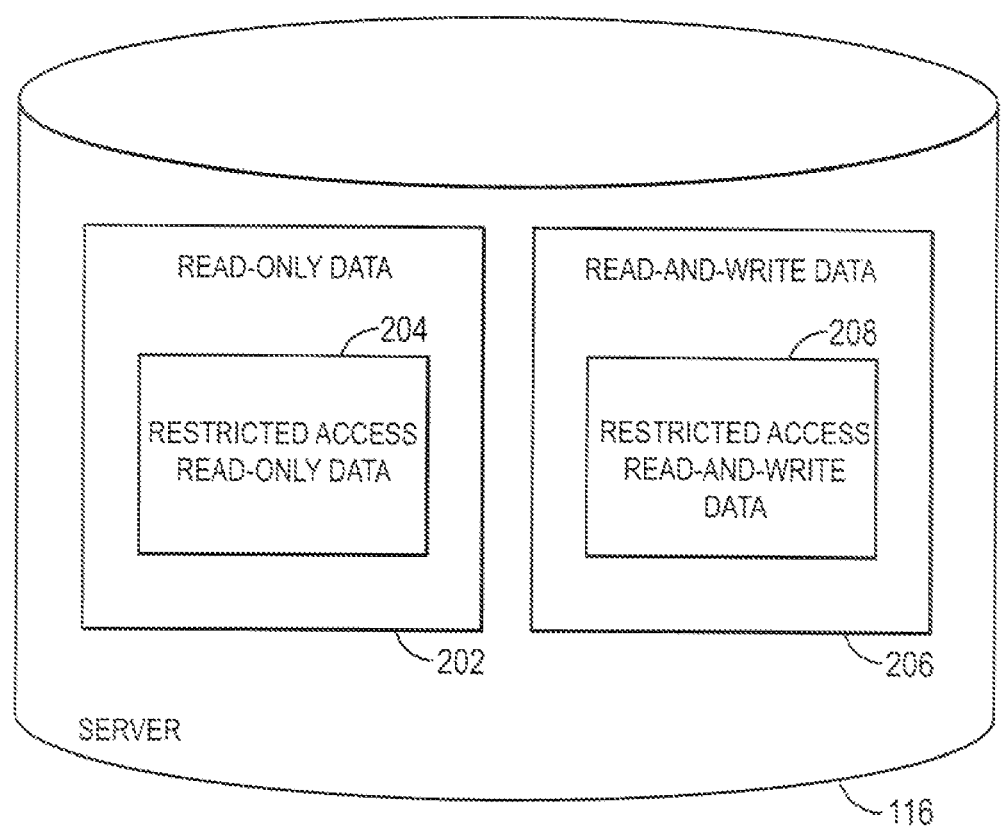
FIG. 2 illustrates a server according to one embodiment of the invention.

FIG. 2 is a block diagram illustrating the server 116 according to one embodiment of the invention. As noted earlier, although the server 116 is not a component of the production station 102, various components of the production station 102 obtain data from and write data in the server 116. The server 116 is adapted to store data, some portions of which may comprise read-only data 202 and other portions of which may comprise read-and-write data 206. For example, in some embodiments, the production station 102 may be adapted to have access only to read-only data stored in the server 116. Examples of read-only data include supplier part number, company part number, CM part number, serial number, and revision of a unit such as of a mechanical subassembly whose revision is not capable of being altered during manufacture (e.g., during assembly). In addition, read-only data may include portions of test results for a unit tested at a previous station in the manufacturing process. For example, in some embodiments, the production station 102 may be adapted to have access to, but not alter, test results obtained at a production station preceding this production station 102 in the manufacturing process.

Some portions of the read-only data 202 may comprise restricted access read-only data 204. Examples of such data include sales order data, such as price, customer identification data, salesperson identification data (e.g., commission percentage), distributor identification data (e.g., discount and annual commit volumes), and purchase order data. The purchase order data may be designated restricted access read-only data, because the company or the CM may view such data as having competitive value. Examples include supplier price, applicable discount from the supplier, quantities purchased including cumulative quantities, costed BOM data, and other data that include financial amounts or terms.

Additionally or alternatively, some portions of the data stored in the server 116 may comprise read-and-write data 206. Examples of such data include calibration files, revisions of software and configurations, top level part number, top level serial number, OEM branding (also known as private labeling) data, and shipping record data. In some embodiments, portions of the read-and-write data 206 may comprise restricted access read-and-write data 208. Examples include defect rates, causes of defects, and as-yet unreleased software revisions being developed and tested at the company headquarters. Access to such data may be restricted to management, financial controllers, design engineers, etc. The access may be restricted because of the potential contractual consequences of the data (e.g., data that affects product warranties), because the data includes trade secrets or sensitive information associated with the customer, or for other reasons.

In some embodiments, some data in the server 116 is restricted access read-only or restricted access read-and-write to some and read-only or read-and-write to other users or production stations. For example, new revisions of software, instructions, and specifications being developed at the company headquarters may be stored in the server 116 and designated read-and-write data with restricted access to development engineers. Upon release to the manufacturing plant, such new revisions may be designated read-only data in the server 116. In addition, the restricted access designation may be removed or changed to include, for example, some or all users or stations at the manufacturing plant. Access to and retrieval of restricted access data may be implemented on the production station (e.g., on an assembly station 102 or on a PC used for development at the company headquarters), for example, by the use of username and password.

Figure 3:
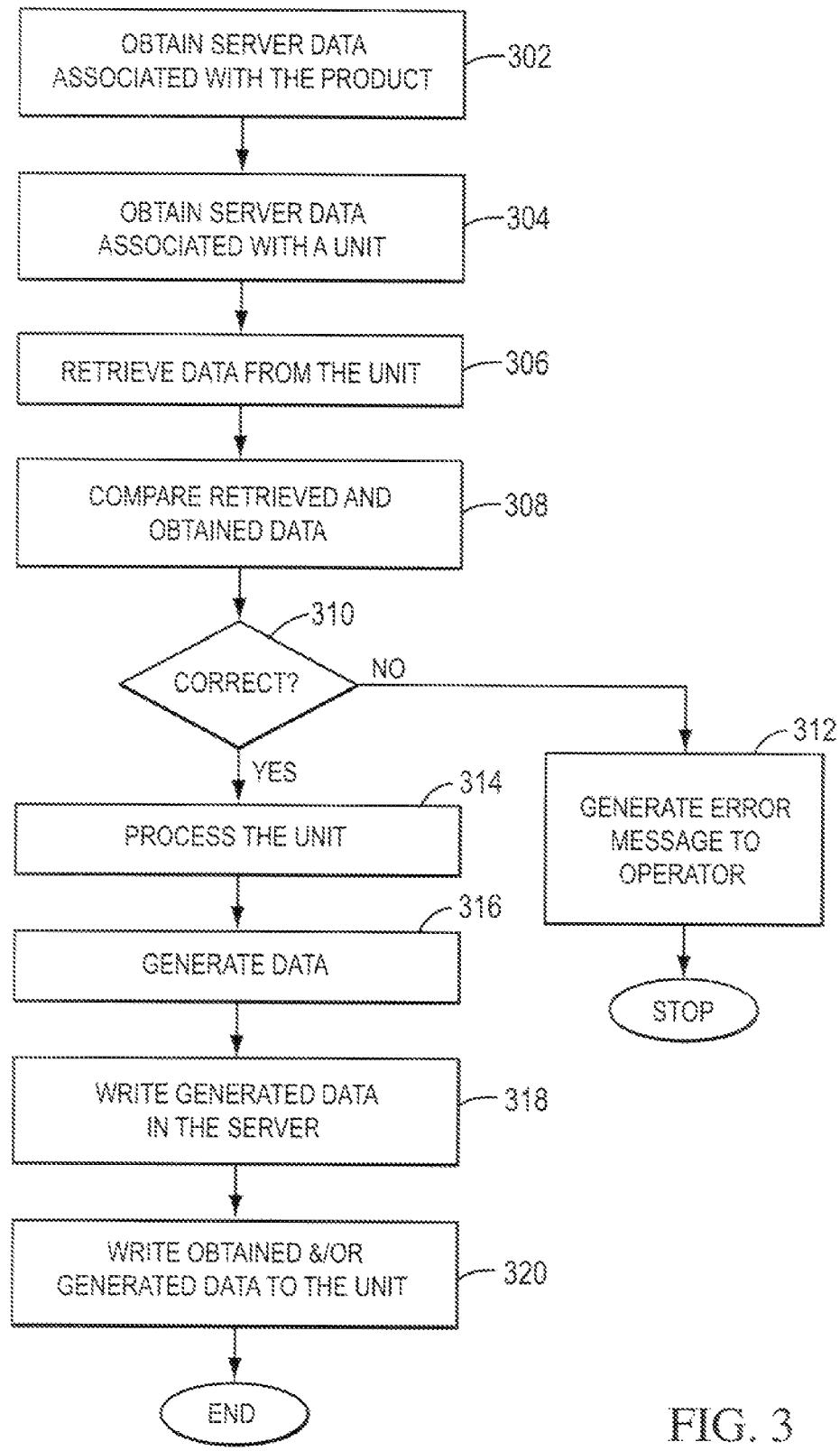
FIG. 3 is a flow diagram of a method for manufacturing products according to one embodiment of the invention.

FIG. 3 is a flow diagram of a method for manufacturing products according to one embodiment of the invention. This method illustrates a method that may be performed by a production station 102 in most configurations. According to the method, the processing of a unit at the production station 102 starts at step 302 by accessing the server 116 to obtain data associated with the product to be assembled. Such data may include the BOM. At step 304, the production station 102 accesses the server 116 to obtain data associated with a particular unit being processed. Such data may include part number, serial number, configuration revision, branding data, calibration file, and so forth depending on the processing to be performed at the production station, including depending on the configuration of the production station. In some embodiments, steps 302 and step 304 may be performed by accessing the server 116 once.

At step 306, the operator retrieves or otherwise inputs data from the unit. Retrieval may include using a scanner or bar code reader. Input may include entering the data via keyboard, key pad, or a pointing device such as a mouse. The retrieved data typically includes at least the data corresponding to the data obtained at step 304. At step 308, the retrieved data is compared with the obtained data. The retrieved data is compared against the obtained data at least twice. First, the retrieved data is compared with the obtained data associated with the unit to verify that the two data sets reflecting the actual configurations match. Second, the retrieved data is compared with the obtained data associated with the product to verify that the actual configuration of the unit is a correct configuration for the product being manufactured. If both comparisons are successful, a success output may be generated at step 310. A manual override at step 310 is typically not possible. If, however, at least one comparison fails or the data sets are otherwise incompatible, a fail output is typically generated and displayed at step 312. If so, the processing of the unit at the production station typically stops. The production station 102 may guide the operator to take remedial action, if possible.

If the data comparisons are successful, the unit is processed at step 314. The nature and extent of the processing depends on the product being manufactured and the configuration of the production station. As part of the processing, data may be generated at step 316. Generation of data may include creating new data or updating existing data. For example, a calibration file for the product being manufactured may change in response to the incorporation of the unit during processing involving assembly. At step 318, parts or all of the generated data may be written in the server 116. The written data typically becomes substantially instantly accessible to other production stations in the manufacturing system, typically production stations following this particular production station in the process flow.

At step 320, data may be written to the unit, for example, in EEPROM. The data may include parts or all of the generated data, the obtained data, or both. The obtained data may include obtained data associated with the products, such as top level product data, obtained data associated with the unit, such as the desired configuration revision, or a combination of both.

Following step 320, in some embodiments, the method may return to step 304. Examples of such embodiments may include methods performed at a production station configured to process a plurality of units. In such a method, the data associated with the product to be produced, i.e., step 302, may be performed only once for two or more units.

In some embodiments, processing at step 314 may include more than one type of function. For example, processing may include assembly as well as testing. In such embodiments, steps 314 through 320 may be performed once per type of processing. For example, steps 314 through 320 may be performed on the unit once for assembly and thereafter again for testing.

Some steps may be optional. For example, some production stations 102 may be configured such that no data is generated. In such embodiments, steps 316, 318 and 320 may be optional. In some embodiments, substantially all steps in the method may be optional. For example, in a method performed on a production station 102 configured as an incoming inspection station, the method may comprise only steps 306 and 314. At step 306, for example, a CD-ROM with supplier data associated with a unit that incorporates technology in a skilled area may be retrieved from the incoming shipment (although not literally from the units themselves). At step 314, processing of the unit amounts to uploading the supplier data in the server.

The unit may fail at one or more of the steps in the method. For example, the unit may be unresponsive to retrieval of data at step 306. In such an event, the method may proceed to step 312, at which an error message is typically generated and the processing stops. The flowchart in FIG. 3 does not include all possible situations in which the method may proceed to step 312. However, those skilled in the art will recognize that multiple such events are possible. The unit failing in some manner at a step in the method may be returned to the supplier, be discarded, or be forwarded to another production station for troubleshooting, for a replacement of one or more components incorporated in the unit, for a software update or upgrade, be returned to FGI, or be otherwise disposed of (not shown in FIG. 3). In some configurations of the production station 102, steps in addition to those illustrated in FIG. 3 may be performed.

Figure 4:
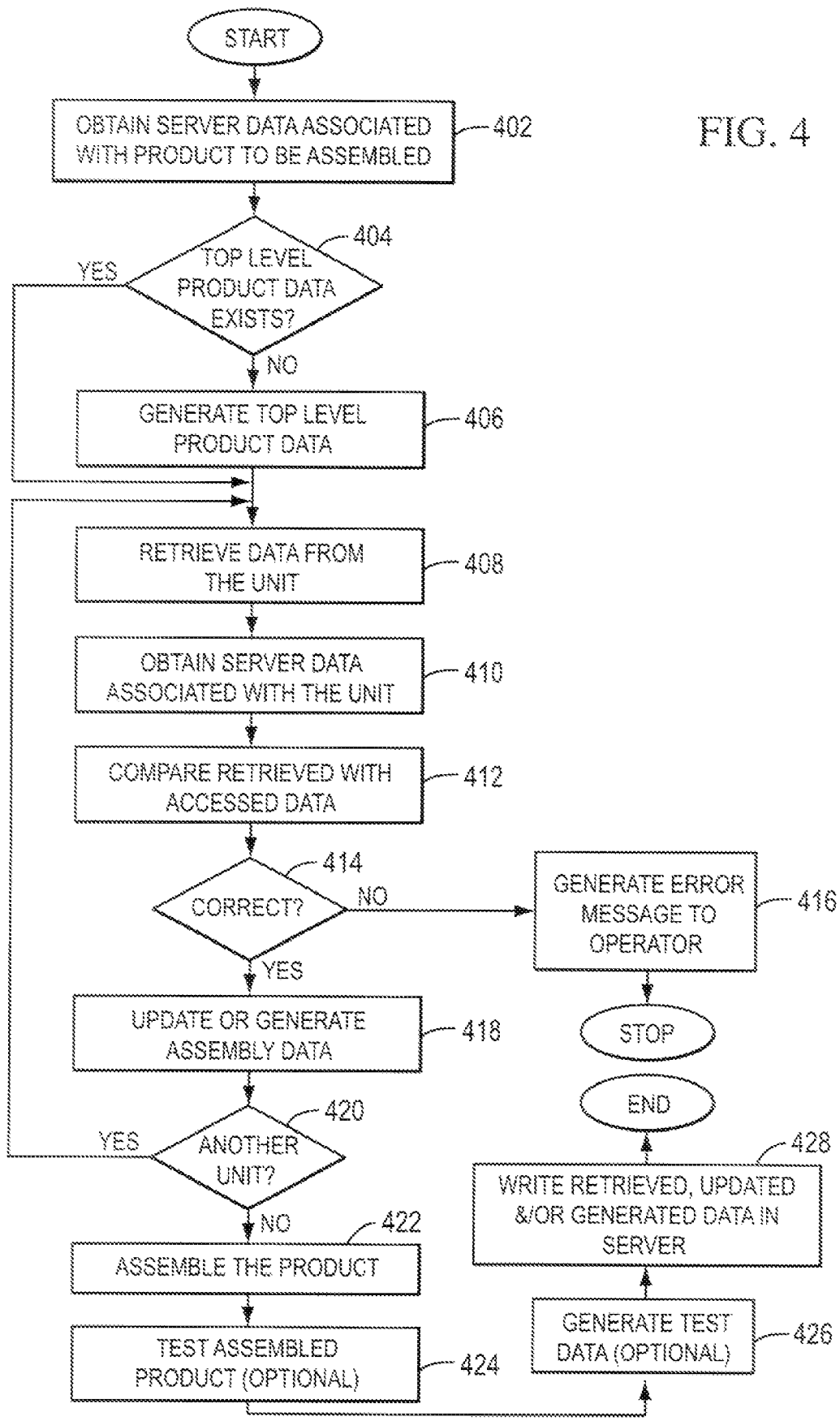
FIG. 4 is a flow diagram of a method for assembling products according to one embodiment of the invention.

FIG. 4 is a flow diagram of a method for assembling products according to one embodiment of the invention. Thus, in this method, the production station 102 is configured to perform assembly functions. According to this method, the assembly starts at step 402 by accessing the server 116 to obtain data associated with the product to be assembled. Such data may include top level product data and the BOM. At step 404, a determination is made whether the accessed data includes top level product data, such as top level serial number and top level product number. If the accessed data does not include such top level product data, at step 406, the top level product data may be generated. In some methods, the determination is made automatically. An example includes a method in which software running on the station 102 makes the determination. In some methods, the determination may be made in an automated fashion. An example includes a method in which data obtained from the server is displayed to the operator, and the operator is allowed to make the determination, i.e., determine whether the top level data is complete, accurate, and the like. In yet some methods, the operator is allowed to make determination based on information available from sources separate from the assembly station 102. For example, the operator may make the determination using his own judgment based on hardcopy information such as the traveler card. A manual determination operation may also be made, for example, in a method in which step 302 is omitted, the server is inaccessible at step 402, or the like. In various embodiments, a combination of automated and manual determination may be used.

If, at step 402, the top level product data does not exist, top level product data may be generated at step 406. The data may not exist if it is, for example, incomplete, or inconsistent or incompatible with other data. The generation may be automatic. For example, the assembly station may generate the top level serial number as the next available number. The generation may be automated. The operator may, for example, be prompted to input a top level serial number within a certain range of acceptable numbers, to select a top level part number from a menu, or to approve to a number proposed by the assembly station 102. In various embodiments, a combination of automated and manual generation may be used.

At step 408, the operator retrieves or otherwise inputs data from the unit. Retrieval may include using a scanner or bar code reader. Input may include entering the data via keyboard, key pad, or a pointing device such as a mouse. The retrieved data typically includes serial number, part number, configuration revision, and calibration file. At step 410, data associated with the unit is obtained from the server. The obtained data typically includes at least the data corresponding to the retrieved data. At step 412, the retrieved data is compared with the obtained data. If the data match or are otherwise compatible, a success output may be generated at step 414. A manual override at step 414 is typically not possible. If, however, the data do not match or are otherwise incompatible, a fail output is typically generated and displayed at step 416, and the assembly typically stops. The assembly station 102 may guide the operator to take remedial action, if possible.

If the data match or are otherwise compatible, the unit is accepted for incorporation into the product at step 418. Assembly data may also be generated. Generation may include creating the data or updating existing data. For example, the calibration file for the product being assembled may change in response to the incorporation of the unit. If so, the calibration file associated with the top level product data may be generated at step 418 and written in the server 116. The written data typically becomes substantially instantly accessible to other production stations in the manufacturing system. Examples of such stations include subsequent production stations such as test or branding stations.

At step 420, a determination is made whether to incorporate another unit into the product. If so, the method repeats from step 408 for the next unit until all units to be incorporated have been accepted or otherwise processed.

At step 422, the accepted units may be actually incorporated into the product. In some embodiments, each unit may be incorporated into the product at the step at which it is accepted. However, in some embodiments, the product may be designed such that two or more units are to be assembled together such as assembly jointly, at the same time, or in parallel. In other embodiments, the software, instructions, and specifications installed on the assembly station 102 may be adapted such that some units are to be incorporated upon acceptance and others at step 422.

At step 424, the assembled product may be tested. Step 424 may be optional. For example, step 424 may be included only in embodiments in which the assembly station 102 includes a testing component 114. In some embodiments, even though the assembly station 102 includes the testing component 114, some or all testing of the assembled product may be performed at a production station other than the assembly station 102. If step 424 is included in the method and testing is performed, test data may be generated in step 426. Such test data may include actual measured values of all tested parameters for each test run.

In some embodiments, parts or all generated assembly data and, optionally, test data may be written in the server at the step at which such data is generated, i.e., at step 418, step 426, or both. Alternatively, parts of or all such data may written in the server at step 428.

Following step 428, the assembled product is forwarded to the next stage, if any, in the manufacturing process. Examples of the next stage include a calibration station, and an OEM branding station. In some manufacturing systems, the assembly station 102 comprises the final production station, and the next stage may be FGI (finished goods inventory) or a shipping area. Such steps following step 428 are not shown in FIG. 4.

The unit or the assembled product may fail processing at one or more of the steps in the method. For example, the unit may be unresponsive to retrieval of data at step 408. In such an event, the method may proceed to step 416, at which an error message is typically generated and the assembly stops. The flowchart in FIG. 4 does not include all possible situations in which the method may proceed to step 416. However, those skilled in the art will recognize that multiple such events are possible. The unit failing processing in some manner at a step in the method may be returned to the supplier, be discarded, or be forwarded to a production station for troubleshooting, for a replacement of one or more components incorporated in the unit, for a software update or upgrade, be returned to FGI, or be otherwise disposed of (not shown in FIG. 4).

In some methods, steps 402 through 406 may be omitted. In some methods, steps 402 through 406, steps 422 through 428, or another combination of steps may be performed by one or more separate production stations.

Although methods for a production station configured other than in general (FIG. 3) and as an assembly station (FIG. 4) are not explicitly described herein, those skilled in the art will recognize that a number of variations are possible.

In sum, the present invention contemplates various design approaches to address manufacture of products incorporating technology in skilled areas. Preferably, these include storing data in a server such that the data is readily accessible to various production stations used in the manufacturing process. Although the present invention has been described in considerable detail with reference to certain preferred embodiments thereof, other embodiments are possible. Therefore, the spirit and scope of the appended claims should not be limited to the description of the preferred embodiments contained herein.

We claim:

1. A production station for a product to be manufactured, the product to be manufactured including two or more units, the production station comprising:

a data retrieval component operative to retrieve data from a received first unit of two or more units intended for assembly in a product to be manufactured, the received first unit incorporating technology in a skilled area, the retrieved data from the received first unit identifying technology actually incorporated in the received first unit;

a data access component operative to obtain, from a server, data associated with an acceptable first unit planned for assembly in the product to be manufactured, the obtained data identifying technology that should be incorporated in the received first unit, the acceptable first unit being identified based on the product to be manufactured;

a data verification component operative to compare the retrieved data from the received first unit with the obtained data from the server to verify that the technology actually incorporated in the received first unit is the technology that should be incorporated in the received first unit and that the technology actually incorporated in the received first unit is planned for assembly in the product to be manufactured, and to generate an output based on the comparison, the output indicating whether the received first unit is ready for assembly in the product to be manufactured; and an interface operative to provide guidance to an operator with or without skills in the technology to allow assembly of the received first unit in the product to be manufactured when the output indicates that the received first unit is ready for assembly in the product to be manufactured, and to provide guidance to the operator with or without skills in the technology to take remedial action when the output indicates that the received first unit is not ready for assembly in the product to be manufactured.

2. The production station of claim 1, wherein the retrieved data identifying the technology actually incorporated in the received first unit indicates a configuration of software installed on the received first unit.

3. The production station of claim 2, wherein the data verification component is further operative to compare the configuration of the software installed on the received first unit to a configuration of desired software indicated in the obtained data identifying the technology that should be incorporated in the received first unit.

4. The production station of claim 3, further comprising a data writing component operative to reconfigure the software installed on the received first unit if the comparison indicates that the configuration of the software installed on the received first unit is different from the configuration of the desired software indicated in the obtained data identifying the technology that should be incorporated in the received first unit.

5. The production station of claim 1, wherein the retrieved data identifying the technology actually incorporated in the received first unit indicates a version of software installed on the received first unit.

6. The production station of claim 5, wherein the data verification component is further operative to compare the version of the software installed on the received first unit to a desired version indicated in the obtained data identifying the technology that should be incorporated in the received first unit.

7. The production station of claim 6, further comprising a data writing component operative to update the software installed on the received first unit to the desired version indicated in the obtained data identifying the technology that should be incorporated in the received first unit if the comparison indicates that the version of the software installed on the received first unit is different from the desired version.

8. The production station of claim 1, in which the data retrieval component, the data access component, and the data verification component are together operative to perform a production function.

9. The production station of claim 8, wherein the production function includes one or more of incoming inspection, assembly, testing, branding, and post functional testing of the manufactured product.

10. The production station of claim 8, wherein the data access component is further operative to obtain from the server software, instructions, and specifications associated with the production function and having been developed and written in the server, and wherein the data retrieval component, the data access component, and the data verification component are further operative to execute such obtained software, instructions, and specifications.

11. The production station of claim 10, wherein the data access component is further operative to initiate obtaining the software, instructions, and specifications from the server.

12. The production station of claim 10, wherein the data access component is further operative to download the software, instructions, and specifications from the server in response to a download command initiated remotely.

13. A method for processing a product to be manufactured, the product to be manufactured including two or more units, the method comprising:

retrieving data from a received first unit of two or more units intended for assembly in a product to be manufactured, the received first unit incorporating technology in a skilled area, the retrieved data from the received first unit identifying technology actually incorporated in the received first unit;

obtaining, from a server, data associated with an acceptable first unit planned for assembly in the product to be manufactured, the obtained data identifying technology that should be incorporated in the received first unit, the acceptable first unit being identified based on the product to be manufactured;

comparing the retrieved data from the received first unit with the obtained data from the server to verify that the technology actually incorporated in the received first unit is the technology that should be incorporated in the received first unit and that the technology actually incorporated in the received first unit is planned for assembly in the product to be manufactured;

generating an output based on the comparison, the output indicating whether the received first unit is ready for assembly in the product to be manufactured; and providing guidance to an operator with or without skills in the technology to allow assembly of the received first unit in the product to be manufactured when the output indicates that the received first unit is ready for assembly in the product to be manufactured, and providing guidance to the operator with or without skills in the technology to take remedial action when the output indicates that the received first unit is not ready for assembly in the product to be manufactured.

14. The method of claim 13, wherein the retrieved data identifying the technology actually incorporated in the received first unit indicates a configuration of software installed on the received first unit.

15. The method of claim 14, wherein comparing the retrieved data from the received first unit with the obtained data from the server comprises comparing the configuration of the software installed on the received first unit to a configuration of desired software indicated in the obtained data identifying the technology that should be incorporated in the received first unit.

16. The method of claim 15, further comprising reconfiguring the software installed on the received first unit if the comparison indicates that the configuration of the software installed on the received first unit is different from the configuration of the desired software indicated in the obtained data identifying the technology that should be incorporated in the received first unit.

17. The method of claim 13, wherein the retrieved data identifying the technology actually incorporated in the received first unit indicates a version of software installed on the received first unit.

18. The method of claim 17, wherein comparing the retrieved data from the received first unit with the obtained data from the server comprises comparing the version of the software installed on the received first unit to a desired version indicated in the obtained data identifying the technology that should be incorporated in the received first unit.

19. The method of claim 18, further comprising updating the software installed on the received first unit to the desired version indicated in the obtained data identifying the technology that should be incorporated in the received first unit if the comparison indicates that the version of the software installed on the received first unit is different from the desired version.

* * * * *